(12) United States Patent
Thorne et al.

(10) Patent No.: US 10,884,147 B2
(45) Date of Patent: Jan. 5, 2021

(54) SYSTEM AND METHOD FOR RESERVOIR FACIES CLASSIFICATION THAT SEGMENTS BOTH PETROPHYSICAL AND GEOPHYSICAL PROPERTIES

(71) Applicant: CHEVRON U.S.A. INC., San Ramon, CA (US)

(72) Inventors: Julian A. Thorne, Houston, TX (US);
Andrew Royle, Houston, TX (US);
Michael Pyrcz, Houston, TX (US);
Sebastien B. Strebelle, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 418 days.

(21) Appl. No.: 15/835,656

(22) Filed: Dec. 8, 2017

(65) Prior Publication Data
US 2019/0179046 A1 Jun. 13, 2019

(51) Int. Cl.
*G01V 1/30* (2006.01)
*G01V 1/50* (2006.01)
*G01V 1/37* (2006.01)

(52) U.S. Cl.
CPC ............. *G01V 1/306* (2013.01); *G01V 1/375* (2013.01); *G01V 1/50* (2013.01); *G01V 2210/66* (2013.01)

(58) Field of Classification Search
CPC .......... G01V 1/306; G01V 1/375; G01V 1/50; G01V 2210/66
See application file for complete search history.

(56) References Cited

U.S. PATENT DOCUMENTS

| | | | | |
|---|---|---|---|---|
| 5,012,675 A | * | 5/1991 | Koller | G01V 1/34 73/432.1 |
| 9,897,721 B2 | * | 2/2018 | Fei | E21B 43/00 |
| 2017/0192115 A1 | * | 7/2017 | Baker | G01V 1/307 |
| 2018/0106917 A1 | * | 4/2018 | Osypov | G01V 1/50 |
| 2018/0342073 A1 | * | 11/2018 | Matsumura | G01N 23/046 |

* cited by examiner

*Primary Examiner* — Krystine E Breier
(74) *Attorney, Agent, or Firm* — Esplin & Associates, PC

(57) ABSTRACT

A computer implemented method for identifying reservoir facies in a subsurface region includes obtaining a set of seismic data points of both petrophysical and geophysical parameters relating to the subsurface region, identifying one or more correlated clusters of petrophysical parameters, generating, from the one or more correlated clusters of petrophysical parameters, one or more corresponding multi-dimensional clusters of seismic data points, storing, in a facies database, a multi-dimensional cluster center point for at least one multi-dimensional clusters, and recursively splitting the multi-dimensional clusters into distinct sub-clusters of seismic data points corresponding to facies types.

12 Claims, 7 Drawing Sheets
(1 of 7 Drawing Sheet(s) Filed in Color)

SYSTEM AND METHOD FOR RESERVOIR FACIES CLASSIFICATION THAT SEGMENTS BOTH PETROPHYSICAL AND GEOPHYSICAL PROPERTIES

FIELD

The present disclosure relates generally to geostatistical modeling and more particularly to geostatistical facies modeling using clustering-based facies classification techniques.

BACKGROUND

Identifying subsurface locations likely to contain a reservoir (e.g., containing gas or oil) involves techniques using semi-automated and fully-automated facies classification. These methods consider variables including a variety of petrophysical and sedimentological parameters such as porosity, permeability, fraction of shale, and sedimentary texture, and use multivariate statistics analysis to build facies classifications and derive corresponding facies well logs from those parameters. Seismic data are calibrated to those facies well logs to interpolate facies between wells and build facies-based reservoir models. Without seismic information integrated in facies classification, facies-based reservoir models are often inconsistent with the seismic data.

While workflows have been developed to include seismic information in facies-based reservoir models, these workflows tend to focus on the calibration of locally inferred seismic attributes or the interpretation of large scale seismic geobodies. These workflows neglect the fundamental criteria used to build facies classifications. Consequently, although the integration of seismic data into facies-based reservoir models is most often required to make such models realistic enough to inform reservoir management decisions (such as infill and injector locations, right-sizing of facilities, etc.), there is a gap in the ability to perform this integration.

Moreover, geostatistical modeling using seismic data to determine a target subsurface location with desired reservoir facies is challenging using existing facies classification methods which classify facies by petrophysical properties only (e.g., permeability and porosity) because observing petrophysical properties directly from seismic signal is not possible. Instead, seismic signal analysis should be used to observe geophysical properties, and a method for correlating geophysical properties to petrophysical properties through facies classification is needed.

SUMMARY

Embodiments of the present disclosure provide systems and methods for automating the classification of reservoir facies by identifying clusters of seismic data points based on both petrophysical and geophysical information and updating the classification by reproducing geophysical constraints. For example, a method of facies classification may include generating a facies classification from petrophysical properties, modeling a relationship between geophysical properties and petrophysical properties, applying additional facies segmentation of geophysical properties based on this modeled relationship, and iteratively reapplying these steps. The iterative process may be terminated when criteria based on the significance of the further segmentation is not met or based on user specification of number of iterations or number of additional segmentations. In some examples, the method may use canonical correlation analysis to identify distinct sub-clusters present within multi-dimensional clusters of geophysical and petrophysical data points.

An aspect of an embodiment of the present disclosure includes a method for modeling a pair of related properties of a subsurface region including obtaining data representative of the properties of the subsurface region, selecting parameters for the modeling, the parameters including a maximum number of clusters, a random seed and a number of points in an output cloud, and/or solving for a number and location of cluster centers.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale. The patent or patent application contains at least one drawing executed in color. Copies of this patent or patent application publication with color drawing(s) will be provided by the Office upon request and payment of the necessary fee.

FIGS. 3A and 3B are a pair of plots illustrating an analysis of subsurface facies data consistent with embodiments disclosed herein, wherein FIG. 3A represents measured core data clustered by correlating permeability and porosity data, and FIG. 3B represents the same measured core data clustered by correlating two geophysical parameters.

FIGS. 4A and 4B are a pair of plots illustrating an analysis of subsurface facies data consistent with embodiments disclosed herein, wherein FIG. 4A represents measured core data clustered by correlating permeability and porosity data, and FIG. 4B represents the same measured core data clustered by correlating two geophysical parameters.

Figure 1A:
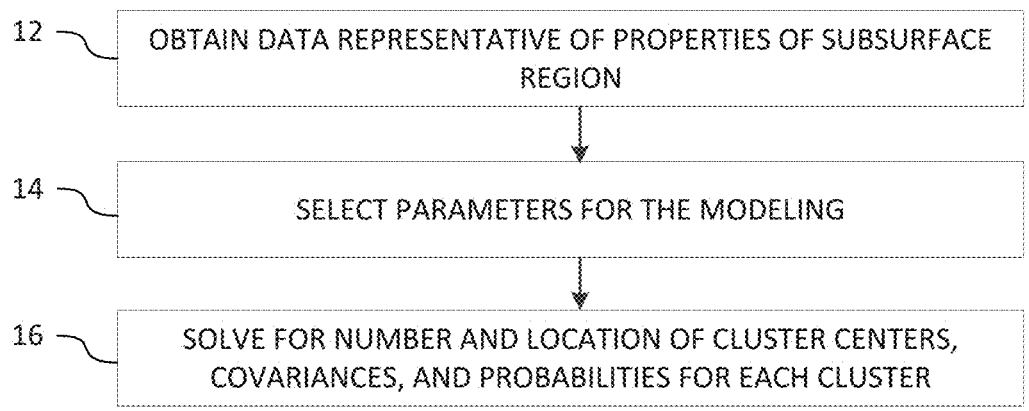
FIG. 1A is a flow chart illustrating a method for classifying subsurface facies, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the present disclosure provide systems and methods for facies classification using clustering techniques. In some embodiments, a method for identifying reservoir facies in a subsurface region includes obtaining a set of multi-dimensional data points, including petrophysical data corresponding to petrophysical characteristics of the subsurface region and geophysical data corresponding to geophysical characteristics of the subsurface region, generating multi-dimensional clusters of the petrophysical and corresponding geophysical data, and identifying multi-dimensional cluster center points. For example, petrophysical characteristics may include porosity and permeability, whereas geophysical characteristics may include information about seismic properties of the material such as shear impedance, acoustic impedance, p-wave velocity, s-wave velocity, or the ratio of p- and s-wave velocities.

Example processes for identifying multi-dimensional clusters may include selecting one or more modeling parameters and solving for a number and location of cluster centers, covariances, and probabilities for the multi-dimensional clusters.

Some examples of the method for identifying reservoir facies in a subsurface region includes applying a canonical correlation analysis to linear combinations of geophysical and petrophysical data points to identify a canonical factor with the highest significance, e.g., relative to other canonical factors. The method may include determining a geophysical distribution based on the canonical factor and determining a cutoff point that splits the geophysical distribution (e.g., of data points in the geophysical dimensions of the multi-dimensional clusters) into two populations, or sub-clusters. If the statistical difference between the two populations exceeds a threshold significance value, the method may include storing the multi-dimensional sub-clusters (i.e., sub-clusters of both the geophysical data and corresponding petrophysical data) defined by the geophysical distribution cutoff.

The multi-dimensional sub-clusters may be iteratively split in recursive manner using the process described above until the statistical difference between two resulting populations falls below the threshold significance value. The threshold significance value may be obtained from a user interface, calculated via an algorithm, or stored in a memory. The threshold significance value may be adjusted (e.g., lowered) if the number of sub-clusters generated from the process is below a target number of sub-clusters. The target number of sub-clusters may be obtained from a user interface, calculated via an algorithm, or stored in a memory.

In some embodiments, a method for facies classification may include storing a multi-dimensional cluster center point, for example, in a facies database. The method may include storing a facies type for the first distinct geophysical distribution with a first set of correlated petrophysical and geophysical characteristics corresponding to the first cluster center, storing a facies type for the second distinct geophysical distribution with a second set of correlated petrophysical and geophysical characteristics corresponding to the second cluster center. Additional facies types may be stored for additional segmented geophysical distributions.

In some examples, the method includes determining a statistical correlation between the first and the second distinct geophysical populations and determining, if the statistical correlation between the first and the second distinct geophysical populations is below a threshold significance level, determining a second cutoff point in the first geophysical distribution at which the first geophysical distribution splits into third and fourth distinct geophysical populations and/or the second geophysical distribution splits into fifth and sixth distinct geophysical populations.

Some embodiments of the method may include obtaining a threshold number of geophysical populations and, if a number of distinct geophysical populations is below the threshold number of geophysical populations, increasing the threshold significance level and repeating the canonical correlation analysis of the geophysical and petrophysical data points.

Embodiments disclosed herein provide a method of processing a seismic signal to determine a target subsurface location with a desired reservoir facies. For example, a method of processing a seismic signal to determine a target subsurface location may include obtaining, with a seismic sensor, the seismic signal from a subsurface location, extracting geophysical data points from the seismic signal, the geophysical data points corresponding to geophysical characteristics, obtaining, from a facies database, a petrophysical characteristic correlated to at least one geophysical characteristic, and determining the subsurface location is the target subsurface location with the desired reservoir facies based on the petrophysical characteristics and correlated geophysical characteristics.

In some examples, identifying the target reservoir facies in a subsurface region includes obtaining a set of petrophysical data points relating to multiple petrophysical characteristics of the subsurface region and a set of geophysical data points relating to multiple geophysical characteristics of the subsurface region, identifying one or more petrophysical clusters of petrophysical data points and corresponding petrophysical characteristics, identifying, for at least one petrophysical cluster, one or more geophysical clusters of geophysical data points and corresponding geophysical characteristics, and storing, in a facies database, a multi-dimensional cluster center point for at least one geophysical cluster and corresponding petrophysical cluster. The identifying one or more geophysical clusters may include identifying subclusters of correlated geophysical and petrophysical data points by applying a multivariate statistical correlation analysis.

Applying a multivariate statistical correlation analysis may include selecting, from a canonical correlation analysis of the geophysical and petrophysical data points, a set of geophysical canonical weights and a set of petrophysical canonical weights, determining a canonical factor by identifying the geophysical and petrophysical canonical weights with a high relative significance. The analysis may further include determining a first cutoff point in a geophysical distribution corresponding to a first deviation point at which the geophysical distribution splits into a first distinct geophysical population and a second distinct geophysical population.

Embodiments of a method of processing a seismic signal to determine a target subsurface location may include determining a statistical correlation between the first and the second distinct petrophysical populations. In some examples, the method includes determining, if the statistical correlation between the first and the second distinct petrophysical populations is below a threshold significance level, a second cutoff point in the geophysical distribution corresponding to a second deviation at which the first geophysical distribution splits into third and fourth distinct geophysical populations and/or the second geophysical distribution splits into fifth and sixth distinct geophysical populations. The method may include obtaining a threshold number of geophysical populations and, if a number of distinct geophysical populations is below the threshold number of geophysical populations, increasing the threshold significance level and repeating the multivariate statistical correlation analysis of the geophysical and petrophysical data points.

Embodiments disclosed herein provide a system for identifying reservoir facies in a subsurface region. For example, the system may include a canonical analysis logical circuit, a user interface, and a data store. The canonical analysis logical circuit may include a processor and a non-transitory medium with computer executable instructions embedded thereon. The computer executable instructions may cause the processor to obtain, from the user interface, a set of petrophysical data points relating to multiple petrophysical characteristics of the subsurface region and a set of geophysical data points relating to multiple geophysical characteristics of the subsurface region. The computer executable instructions may cause the processor to identify one or more multi-dimensional clusters of petrophysical and geophysical data points corresponding to petrophysical and geophysical characteristics, respectively. The computer executable instructions may cause the processor to store, in a facies database located on the data store, a multi-dimensional cluster center point. In some examples, the canonical analysis logical circuit may identify one or more multi-dimensional clusters by selecting one or more modeling parameters, and solving for a number and location of cluster centers, covariances, and probabilities.

In some examples, the computer executable instructions cause the processor to identify subclusters of correlated geophysical and petrophysical data points by applying a multivariate statistical correlation analysis. The computer executable instructions may cause the processor to apply the multivariate statistical correlation analysis by selecting, from a canonical correlation analysis of the geophysical and petrophysical data points, a set of geophysical and petrophysical canonical weights and determining a geophysical and petrophysical canonical factor by identifying the geophysical and petrophysical canonical weights with a high relative significance. The canonical analysis logical circuit may determine a first cutoff point in a geophysical distribution generated using the canonical factor, wherein the first cutoff point is a deviation point in the geophysical distribution at which the geophysical distribution splits into a first distinct geophysical population with a first cluster center and a second distinct geophysical population with a second cluster center.

In further embodiments, the canonical analysis logical circuit may store, in the facies database, a first facies type for a first multi-dimensional sub-cluster corresponding to the first distinct geophysical distribution with a first set of correlated petrophysical and geophysical characteristics and a second facies type for a second multi-dimensional sub-cluster corresponding to the second distinct geophysical distribution with a second set of correlated petrophysical and geophysical characteristics.

In some examples, the canonical analysis logical circuit may determine a statistical correlation between the first and the second distinct geophysical populations and determine, if the statistical correlation is below a threshold significance level, a second cutoff point in the first and/or second geophysical distribution, wherein the second cutoff point is a deviation point in the first and/or second geophysical distribution at which the geophysical distribution splits into third and fourth distinct geophysical populations and/or fifth and sixth distinct geophysical populations. Each geophysical population may correspond to a multi-dimensional sub-cluster. The splitting process may be iterated recursively until the statistical correlation between resulting sub-clusters falls below a threshold significance value. In some examples, the canonical analysis logical circuit may obtain a target number of sub-clusters. If a number of distinct geophysical populations is below the target number of sub-clusters, the threshold significance level may be decreased and the splitting process may be repeated.

FIG. 1A shows a method 10 for modeling a pair of related properties of a subsurface region. For example, method 10 may include obtaining data representative of the properties of the subsurface region at step 12. For example, the data may be representative of porosity and permeability. In some examples, the data may be transformed, for example, to log (porosity) versus log (permeability), or porosity versus log (permeability) depending on user preferences and/or other factors. The method 10 may include the steps of selecting parameters for the modeling, the parameters including a maximum number of clusters, a random seed and a number of points in an output cloud at step 14. Method 10 may include solving for a number and location of cluster centers, covariances and probabilities for each cluster at step 16. In some examples, method 10 may include using a maximum-likelihood algorithm to produce a maximum-likelihood model and sampling from the maximum-likelihood model with a probability given by a joint multi-variate Gaussian distribution. In some examples, porosity-permeability points are randomly sampled from the maximum-likelihood model with a probability given by the joint multi-variate Gaussian distribution.

Figure 1B:
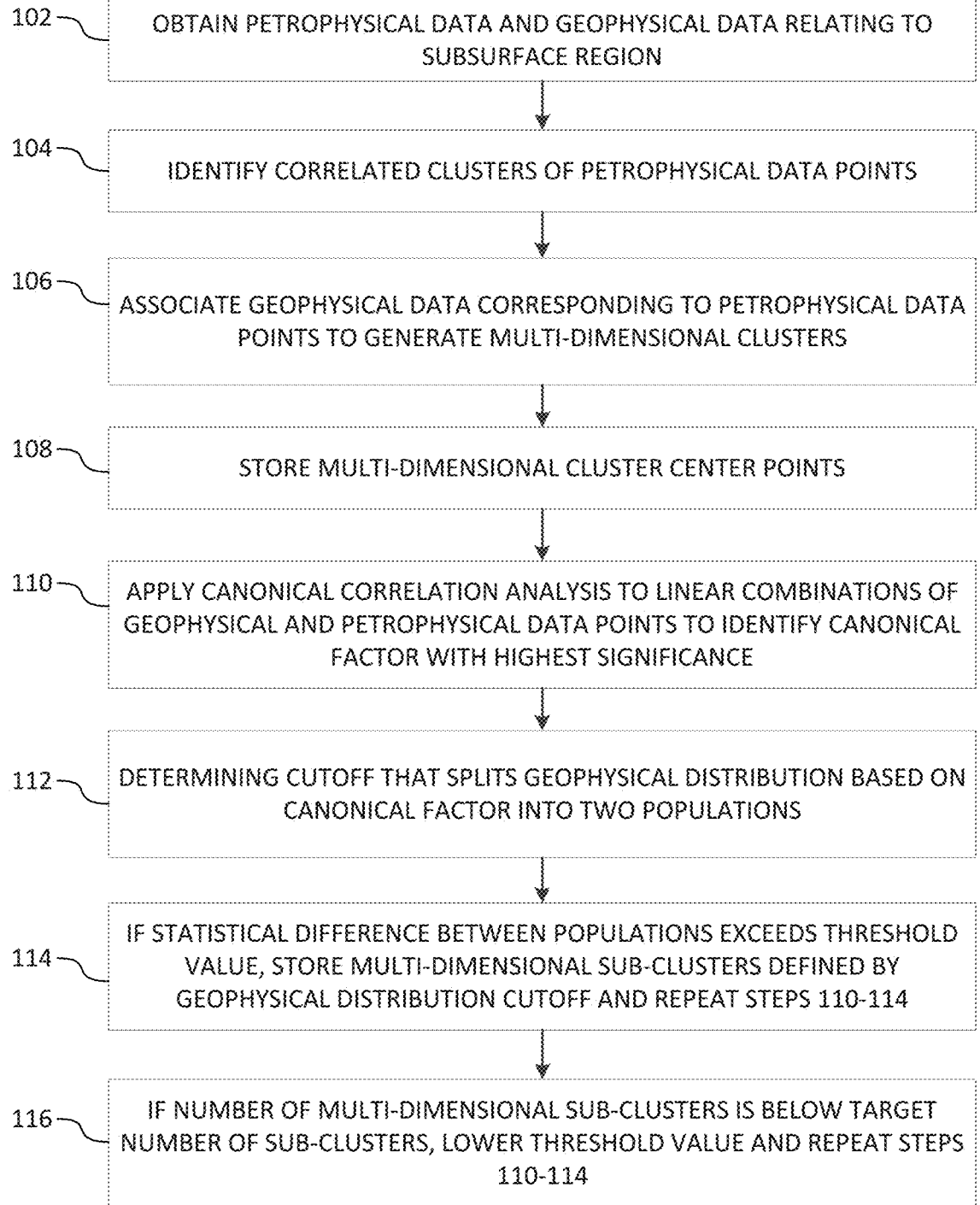
FIG. 1B is a flow chart illustrating a method of facies classification that segments both petrophysical and geophysical properties, consistent with embodiments disclosed herein.

FIG. 1B is a flow chart illustrating a method of facies classification that segments both petrophysical and geophysical properties. For example, a method of facies classification 100 may include obtaining petrophysical data and geophysical data relating to a subsurface region at step 102. Petrophysical data refers to data relating to petrophysical characteristics of a subsurface area. Such data may relate to petrophysical characteristics of the subsurface area which are generally not directly detectable using seismic signal analysis. For example, petrophysical characteristics may include rock properties from a subsurface region relating to how pores in the subsurface area are interconnected, such as porosity and permeability.

Geophysical data refers to data relating to geophysical characteristics of a subsurface region. The geophysical characteristics of the subsurface region may be directly detectable using seismic signal analysis. For example, geophysical characteristics may include acoustic impedance, shear impedance, p-wave velocity, s-wave velocity, the ratio of p- and s-wave velocities, or other geophysical characteristics known in the art. In several embodiments, more than one geophysical characteristic may be used and correlated to determine a cluster of correlated geophysical data points. Determination of which geophysical characteristics to use may be made using local information and statistical analysis.

Still referring to FIG. 1B, method of facies classification 100 may include identifying correlated petrophysical clusters of petrophysical data points at step 104. For example, a petrophysical cluster may correspond to a facies type. Identifying a petrophysical cluster may be performed using processes disclosed herein, for example, as described with respect to FIG. 1A above. The correlated clusters of petrophysical data points may be used as starting points to generate multi-dimensional clusters of petrophysical and geophysical data points. For example, method 100 may include associating geophysical data corresponding to the petrophysical data points to generate the multi-dimensional clusters at step 106. The multi-dimensional cluster point(s) may be stored in a facies database located on a data store. Method 100 may also include identifying and storing multi-dimensional cluster center points corresponding to respective multi-dimensional clusters at step 108. In some embodiments, method 100 may map geophysical properties to petrophysical properties and utilizing this relationship to further segment the facies such that geophysical information is integrated.

Embodiments method 100 may include applying a canonical correlation analysis to linear combinations of geophysical and petrophysical data points to identify a canonical factor with a highest significance (e.g., relative to other canonical factors and/or weights from the canonical correlation analysis) at step 110. For example, a high relative significance may be determined empirically or by applying a Wilk's lambda or Bartlett's V significance test. Method 100 may include generating a geophysical distribution using the canonical factor identified in step 110.

Method 100 may include determining a cutoff that splits the geophysical distribution into two distinct populations at step 112. For example, a statistical correlation between distinct geophysical populations may be compared to a threshold significance value. The threshold significance value may be obtained from a user interface, algorithm, data store, or other data source. If the statistical difference between the geophysical populations exceeds a threshold, method 100 may include storing multi-dimensional sub-clusters defined by the geophysical distribution cutoff (e.g., associated with the geophysical distributions) at step 114. Steps 110 through 114 may be iterated recursively until the statistical correlation between resulting geophysical distributions falls below the threshold significance value. In some examples, a minimum threshold significance value may be set for which the threshold significance value may not fall below.

Method 100 may include obtaining a target number of sub-clusters. If the number of multi-dimensional sub-clusters generated by iterating steps 110 through 114 is lower than the target number of sub-clusters, the method may include lowering the threshold significance value and repeating steps 110 through 114. In some embodiments, a minimum number of sub-clusters may selected from the petrophysical cluster at step 110 and iteratively splitting the petrophysical cluster into sub-clusters if the statistical correlation between distinct petrophysical populations is below a threshold level. For example, the threshold level of significance may be one or more standard deviations. The threshold level of significance may be pre-determined, but adjusted through a user interface to reach a target number of sub-clusters.

Some embodiments of method of facies classification 100 may include determining a deviation point in a geophysical distribution at which the geophysical distribution splits into two distinct populations, each with its own cluster center. The cluster centers may be multi-dimensional center points of the geophysical and petrophysical distributions. For example, the center point may include two or more petrophysical dimensions (e.g., porosity and permeability) and two or more geophysical dimensions (e.g., acoustic impedance, shear impedance, etc.).

In some examples, the facies type corresponding to the distinct geophysical distributions, including a set of correlated petrophysical and geophysical characteristics corresponding to the cluster centers of the distinct geophysical distributions, may be stored in the facies database.

Figure 1C:
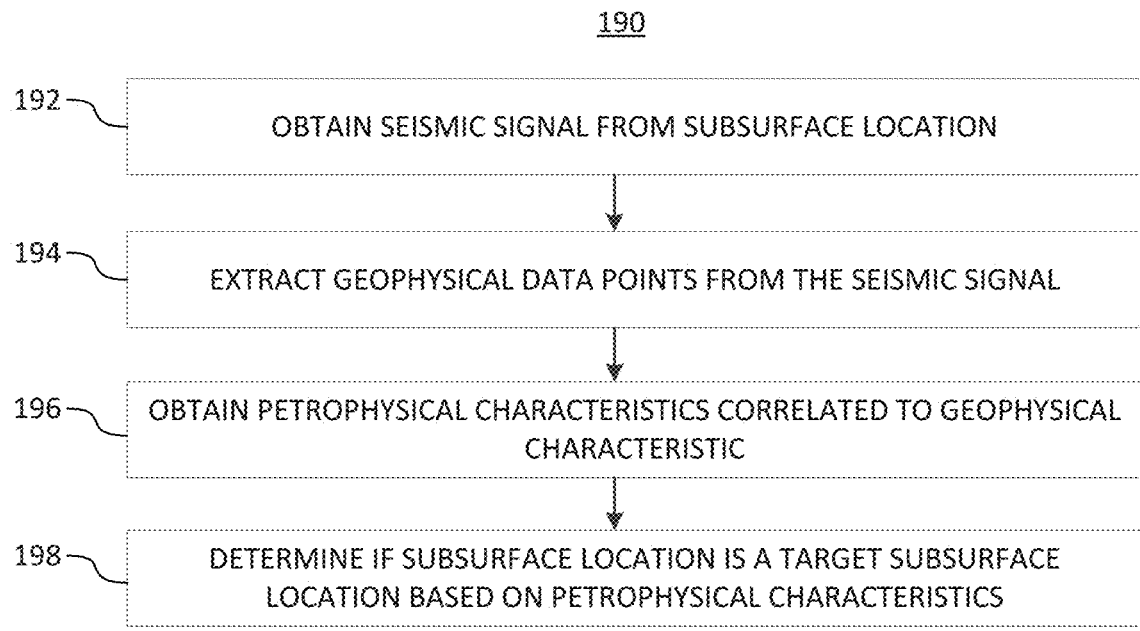
FIG. 1C is a flow chart illustrating a process for identifying clusters of petrophysical and geophysical data points from a subsurface region, consistent with embodiments disclosed herein.

FIG. 1C is a flow chart illustrating a method of determining if a subsurface location is a target subsurface location based on petrophysical characteristics. A method of determining if a subsurface location is a target subsurface location 190 may be used to apply subsurface data from a facies database to a seismic signal to determine whether a reservoir may be present in the subsurface location. Method 190 may include obtaining a seismic signal from a subsurface location at step 192 and extracting geophysical data points from the seismic signal at step 194. For example, the geophysical data points may include values for acoustic impedance value, a shear impedance value, a p-wave velocity, an s-wave velocity, or a ratio of p-wave and s-wave velocities detectable from the seismic signal. The method may include obtaining petrophysical characteristics correlated to the geophysical characteristics identified from the extracted geophysical data points at step 196. For example, obtaining the petrophysical characteristics may include locating one or more multi-dimensional cluster centers stored in the facies database to identify a facies type modeled as having similar geophysical characteristics, and then extracting the corresponding expected petrophysical characteristics from that facies type.

Embodiments of method 190 may include determining if the subsurface location is a target subsurface location based on those petrophysical characteristics at step 198. For example, if the porosity and permeability identified from the facies database are likely to indicate the location of a reservoir, e.g., based on empirical information, then the subsurface location may be determined as being a target subsurface location for exploration and/or creation of a well.

Figure 2:
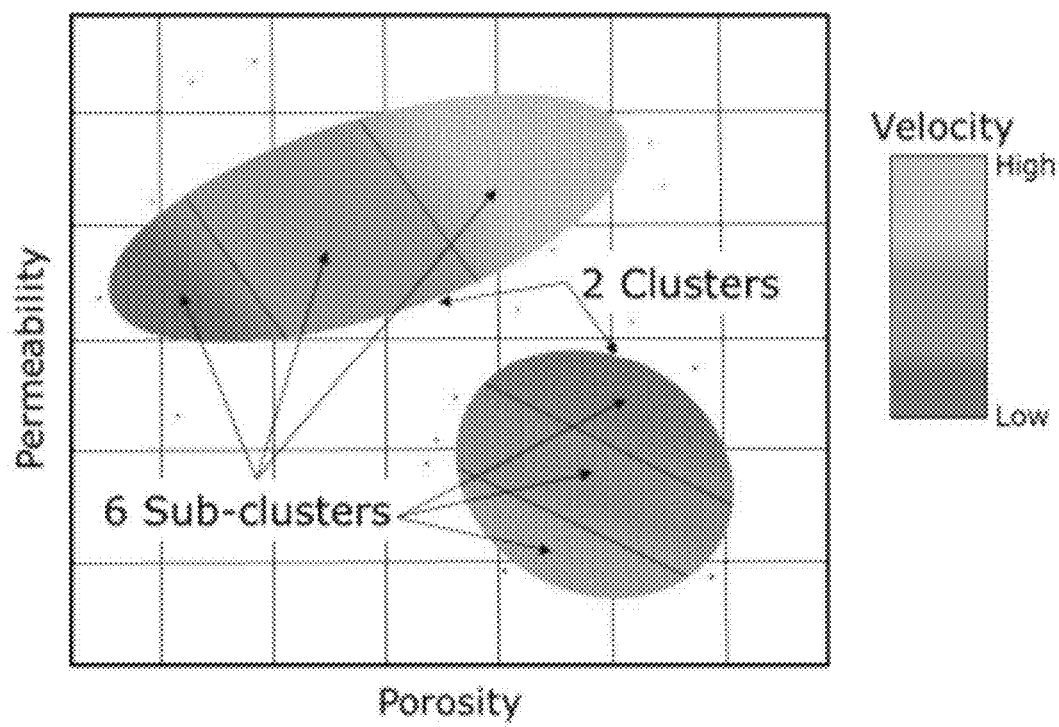
FIG. 2 illustrates a multi-dimensional plot of subsurface facies data with two petrophysical dimensions represented on the axes of the plot and geophysical dimensions represented by changes in fill color.

FIG. 2 illustrates a multi-dimensional plot of subsurface facies data with two petrophysical dimensions represented on the axes of the plot and geophysical dimensions represented by changes in fill color. As illustrated in the example, two multi-dimensional clusters may be classified into multiple sub-clusters using methods disclosed herein. For example, the two multi-dimensional clusters may be initially described using petrophysical dimensions (e.g., permeability and porosity). The seismic data segmented into the two multi-dimensional clusters may also include one or more geophysical parameters, such as velocity. The multi-dimensional clusters may be segmented into sub-clusters using the geophysical data as described herein.

Figure 3A:
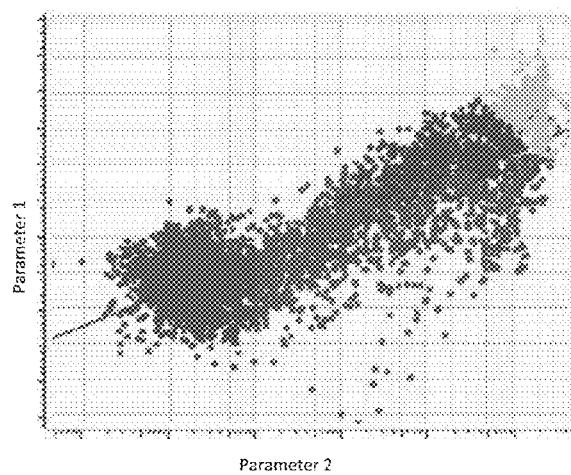
Figure 3B:
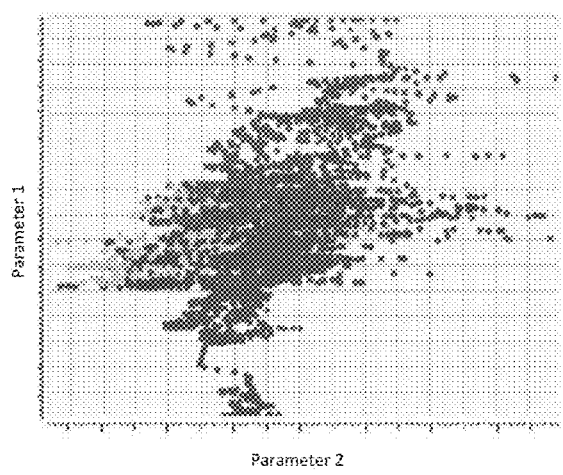

FIGS. 3A and 3B are a pair of plots illustrating an analysis of subsurface facies data consistent with embodiments disclosed herein, wherein FIG. 3A represents measured core data clustered by correlating permeability and porosity data, and FIG. 3B represents the same measured core data clustered by correlating two geophysical parameters. For example, as illustrated, the facies classes may be separated in a petrophysical property space in FIG. 3A showing separation of a facies by flow-related properties such as permeability and porosity, and a geophysical property space in FIG. 3B showing related geophysical property correlation such as shear impedance and acoustic impedance. The application of a facies classification method consistent with embodiments disclosed herein to the subsurface data illustrated in FIGS. 3A and 3B classified facies into two clusters, each with two sub-populations defined by a single cutoff in canonical space.

Figure 4A:
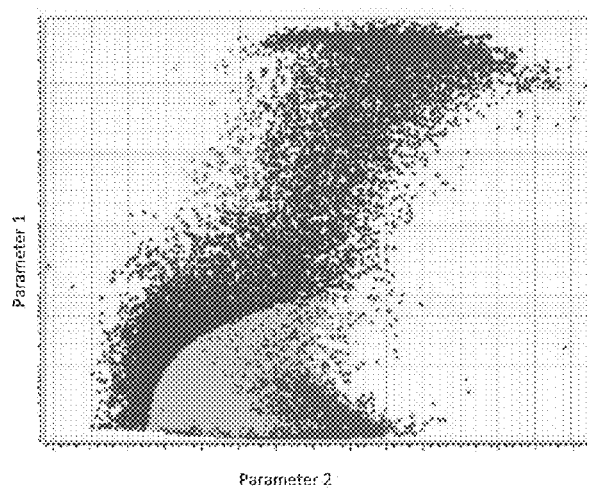
Figure 4B:
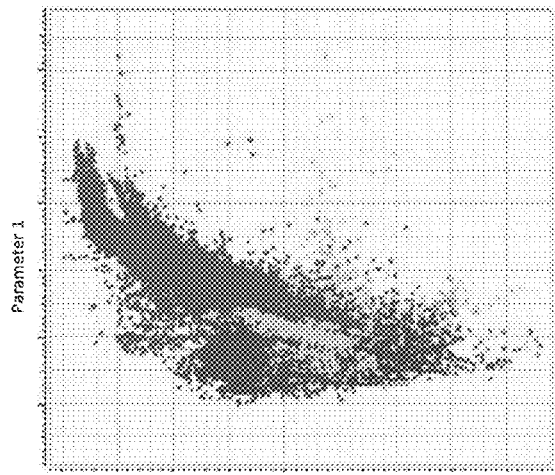

Similarly, FIGS. 4A and 4B are a pair of plots illustrating an analysis of subsurface facies data consistent with embodiments disclosed herein, wherein FIG. 4A represents measured core data clustered by correlating permeability and porosity data, and FIG. 4B represents the same measured core data clustered by correlating two geophysical parameters. The geophysical property space in FIG. 4B may include geophysical characteristics such as the acoustic impedance value and the ratio of p-wave and s-wave velocities. The application of a facies classification method consistent with embodiments disclosed herein to the subsurface data illustrated in FIGS. 4A and 4B classified facies into five classes.

Figure 5:
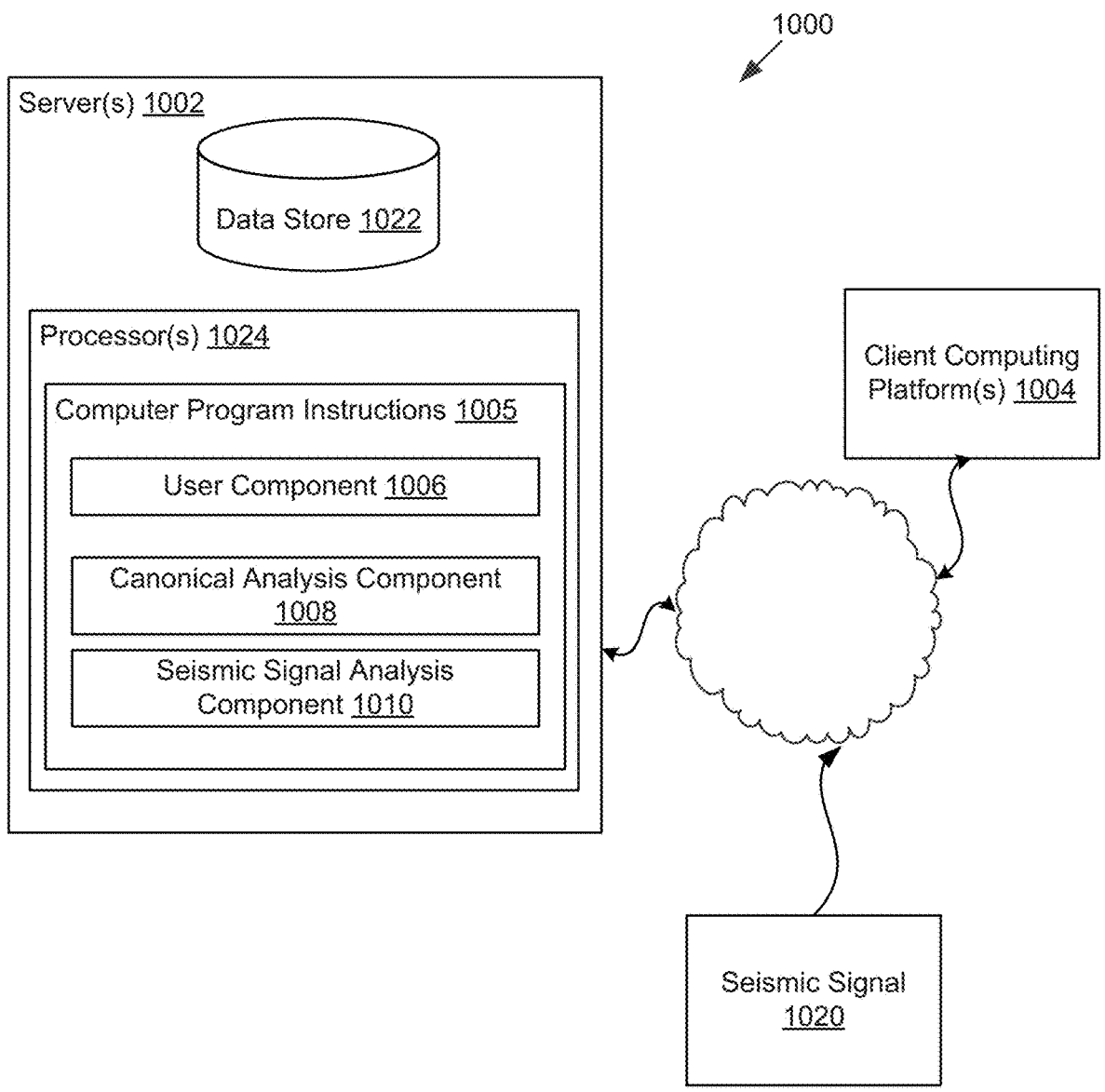
FIG. 5 is a diagram illustrating a system for facies classification that segments both petrophysical and geophysical properties, consistent with embodiments disclosed herein.

FIG. 5 is a diagram illustrating a system for facies classification that segments both petrophysical and geophysical properties. For example, a system for facies classification 1000 may include one or more servers 1002, one or more client computing platforms 1004, and a seismic signal 1020. The seismic signal 1020 may include geophysical data acquired from a subsurface region. A server 1002 may include one or more processors 1024 and one or more non-transitory memories with computer program instructions 1005 embedded thereon. The computer program instructions may include a user component 1006, a canonical analysis component 1008, and a seismic signal analysis 1010. A server 1002 may include a data store 1022. Data store 1022 may include a facies database, for example, as described herein with respect to FIGS. 1A-1C.

User component 1006 may receive input from client computing platform 1004. For example, user component 1006 may cause processor 1024 to generate a graphical user interface, or other user interface for receiving user input from client computing platform 1004. The user input may include modeling parameters, for example, as described with respect to FIG. 1A. Client computing platform(s) 1004 may include desktop computers, laptop computers, tablet computers, handheld computers, smart phones, or other computing platforms capable of operating a client interface.

User components 1006, canonical analysis component 1008, and seismic signal analysis component 1010 may be a logical circuit, or a shared portion of a logical circuit. Canonical analysis component 1008 may include computer program instructions to cause processor 1024 to implement a method for facies classification, for example, as described herein with respect to FIGS. 1A-1B. Seismic analysis component 1010 may include computer program instructions to cause processor 1024 to implement a method for determining if a subsurface location is a target subsurface location based on petrophysical characteristics, for example, as described herein with respect to FIG. 1C.

As will be appreciated, the method as described herein may be performed using a computing system having machine executable instructions stored on a tangible medium. The instructions are executable to perform each portion of the method, either autonomously, or with the assistance of input from an operator.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

Figure 6:
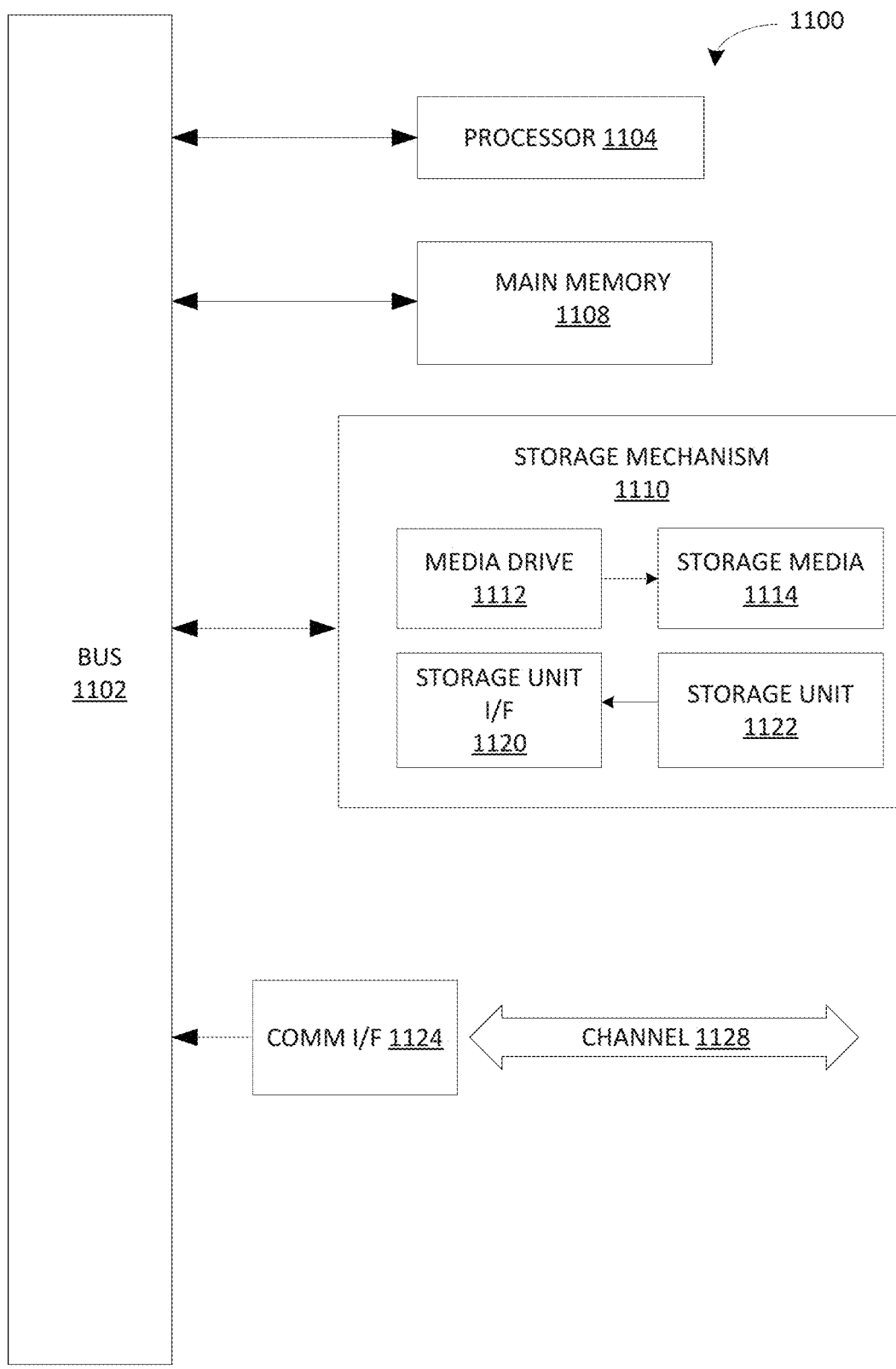
FIG. 6 illustrates an example computing system that may be used in implementing various features of embodiments of the disclosed technology.

As used herein, the terms logical circuit and component might describe a given unit of functionality that can be performed in accordance with one or more embodiments of the technology disclosed herein. As used herein, either a logical circuit or a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components, logical circuits, or components of the technology are implemented in whole or in part using software, in one embodiment, these software elements can be implemented to operate with a computing or logical circuit capable of carrying out the functionality described with respect thereto. One such example logical circuit is shown in FIG. 6. Various embodiments are described in terms of this example logical circuit 1100. After reading this description, it will become apparent to a person skilled in the relevant art how to implement the technology using other logical circuits or architectures.

Referring now to FIG. 6, computing system 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 1100 might represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control components, or other processing devices, such as a processor 1104. Processor 1104 might be implemented using a general-purpose or special-purpose processing component such as, for example, a microprocessor, controller, or other control logic. In the illustrated example, processor 1104 is connected to a bus 1102, although any communication medium can be used to facilitate interaction with other components of logical circuit 1100 or to communicate externally.

Computing system 1100 might include one or more memory components, simply referred to herein as main memory 1108. For example, preferably random access memory (RAM) or other dynamic memory, might be used for storing information and instructions to be executed by processor 1104. Main memory 1108 might be used for storing temporary variables or other intermediate information during execution of instructions to be executed by processor 1104. Logical circuit 1100 might likewise include a read only memory ("ROM") or other static storage device coupled to bus 1102 for storing static information and instructions for processor 1104.

The computing system 1100 might include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into logical circuit 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot, a PCMCIA slot and card, and other fixed or removable storage units 1122 and interfaces 1120 that allow software and data to be transferred from the storage unit 1122 to logical circuit 1100.

Logical circuit 1100 might include a communications interface 1124. Communications interface 1124 might be used to allow software and data to be transferred between logical circuit 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1100 to perform features or functions of the disclosed technology as discussed herein.

Although FIG. 6 depicts a computer network, it is understood that the disclosure is not limited to operation with a computer network, but rather, the disclosure may be practiced in any suitable electronic device. Accordingly, the computer network depicted in FIG. 6 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof;

the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of an component, whether control logic or other components, can be combined in a single package or separately maintained and can be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method for identifying reservoir facies in a subsurface region, the method comprising:
   obtaining a set of seismic data points relating to the subsurface region, the set of seismic data points comprising petrophysical data points and geophysical data points, the petrophysical data points related to petrophysical characteristics of pore interconnection in the subsurface region, the geophysical data points related to geophysical characteristics of the subsurface region that are directly detectable via seismic signal analysis;
   generating one or more two-dimensional correlated petrophysical clusters of the seismic data points by clustering the petrophysical data points;
   generating, from the one or more two-dimensional correlated petrophysical clusters and at least one of the geophysical characteristics, one or more corresponding multi-dimensional clusters of the petrophysical data points and the geophysical data points, wherein individual multi-dimensional clusters of the petrophysical data points and the geophysical data points corresponding to a facies type; and
   storing, in a facies database, cluster centers for at least one of the one or more multi-dimensional clusters of the petrophysical data points and the geophysical data points, wherein the cluster centers that are stored enables identification of facies type based on the seismic signal analysis.

2. The computer implemented method of claim 1, further comprising:
   determining a geophysical distribution of geophysical characteristics within a first multi-dimensional cluster by applying a canonical correlation analysis to the petrophysical data points and the geophysical data points; and
   recursively determining one or more cutoff points to splits the geophysical distribution into two or more distinct multi-dimensional sub-clusters, wherein the one or more cutoff points are points of derivation in the geophysical distribution, such that a first cutoff point in the geophysical distribution is determined at which splits the geophysical distribution into a first multi-dimensional sub-cluster and a second multi-dimensional sub-cluster.

3. The computer implemented method of claim 2, further comprising storing in the facies database a first facies type corresponding to the first multi-dimensional sub-cluster and a second facies type corresponding to the second multi-dimensional sub-cluster.

4. The computer implemented method of claim 2, further comprising:
   determining a statistical difference between the first multi-dimensional sub-cluster and the second multi-dimensional sub-cluster; and
   determining, upon the statistical difference between the first multi-dimensional sub-cluster and the second multi-dimensional sub-cluster falling below a threshold significance level, a second cutoff point in the geophysical distribution at which the first multi-dimensional sub-cluster splits into a third multi-dimensional sub-cluster and a fourth multi-dimensional sub-cluster or at which the second multi-dimensional sub-cluster splits into a fifth multi-dimensional sub-cluster and a sixth multi-dimensional sub-cluster.

5. The computer implemented method of claim 4, further comprising:
   obtaining a threshold number of distinct multi-dimensional sub-clusters to derive from the geophysical distribution;
   determining whether an amount of the distinct multi-dimensional sub-clusters derived from the geophysical distributions is below the threshold number; and
   upon the amount of the distinct multi-dimensional sub-clusters being below the threshold number, increasing the threshold significance level and recursively determining the one or more cutoff points.

6. The computer implemented method of claim 1, wherein the geophysical characteristics comprise an acoustic impedance value, a shear impedance value, a p-wave velocity, an s-wave velocity, or a ratio of p-wave and s-wave velocities and the petrophysical characteristics comprise a porosity value and a permeability value.

7. A system for identifying reservoir facies in a subsurface region, the system comprising:
   a canonical analysis logical circuit;
   a user interface; and
   a data store;
   wherein the canonical analysis logical circuit comprises a processor and a non-transitory medium with computer executable instructions embedded thereon, the computer executable instructions to cause the processor to:
      obtain a set of seismic data points relating to the subsurface region, the set of seismic data points comprising petrophysical data points and geophysical data points, the petrophysical data points related to petrophysical characteristics of pore interconnection in the subsurface region, the geophysical data points related to geophysical characteristics of the subsurface region that are directly detectable via seismic signal analysis;

generate one or more two-dimensional correlated petrophysical clusters of the seismic data points by clustering the petrophysical data points;

generate, from the one or more two-dimensional correlated petrophysical clusters and at least one of the geophysical characteristics, one or more corresponding multi-dimensional clusters of the petrophysical data points and the geophysical data points, wherein individual multi-dimensional clusters of the petrophysical data points and the geophysical data points corresponding to a facies type; and store, in a facies database located in the data store, cluster centers for at least one of the one or more multi-dimensional clusters of the petrophysical data points and the geophysical data points, wherein the cluster centers that are stored enables identification of facies type based on the seismic signal analysis.

8. The system of claim 7, wherein the computer executable instructions further cause the processor to determine a geophysical distribution of geophysical characteristics within a first multi-dimensional cluster by applying a canonical correlation analysis to the petrophysical data points and the geophysical data points; and recursively determine one or more cutoff points to splits the geophysical distribution into two or more distinct multi-dimensional sub-clusters, wherein the one or more cutoff points are points of derivation in the geophysical distribution, such that a first cutoff point in the geophysical distribution is determined at which splits the geophysical distribution into a first multi-dimensional sub-cluster and a second multi-dimensional sub-cluster.

9. The system of claim 8, wherein the computer executable instructions further cause the processor to store, in the facies database, a first facies type corresponding to the first multi-dimensional sub-cluster and a second facies type corresponding to the second multi-dimensional sub-cluster.

10. The system of claim 8, wherein the computer executable instructions further cause the processor to:

determine a statistical difference between the first multi-dimensional sub-cluster and the second multi-dimensional sub-cluster; and determine, upon the statistical difference between the first multi-dimensional sub-cluster and the second multi-dimensional sub-cluster is falling below a threshold significance level, a second cutoff point in the geophysical distribution at which the first multi-dimensional sub-cluster splits into a third multi-dimensional sub-cluster and a fourth multi-dimensional sub-cluster or at which the second multi-dimensional sub-cluster splits into a fifth multi-dimensional sub-cluster and a sixth multi-dimensional sub-cluster.

11. The system of claim 10, wherein the computer executable instructions further cause the processor to:

obtain, from the user interface, a threshold number of distinct multi-dimensional sub-clusters to derive from the geophysical distribution;

determine whether an amount of the distinct multi-dimensional sub-clusters derived from the geophysical distribution is below the threshold number; and upon the amount of the distinct multi-dimensional sub-clusters being below the threshold number, increase the threshold significance level and recursively determining the one or more cutoff points.

12. The system of claim 7, wherein the geophysical characteristics comprise an acoustic impedance value, a shear impedance value, a p-wave velocity, an s-wave velocity, or a ratio of p-wave and s-wave velocities and the petrophysical characteristics comprise a porosity value and a permeability value.

* * * * *

UNITED STATES PATENT AND TRADEMARK OFFICE
CERTIFICATE OF CORRECTION

PATENT NO. : 10,884,147 B2  
APPLICATION NO. : 15/835656  
DATED : January 5, 2021  
INVENTOR(S) : Julian A. Thorne et al.

Page 1 of 1

It is certified that error appears in the above-identified patent and that said Letters Patent is hereby corrected as shown below:

In the Claims

In Claim 5, Column 14, Line 42, please delete "distributions" and insert --distribution--, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*